S. G. Cheever.
Harness Girth.
Nº 91,087. Patented Jan. 8, 1869
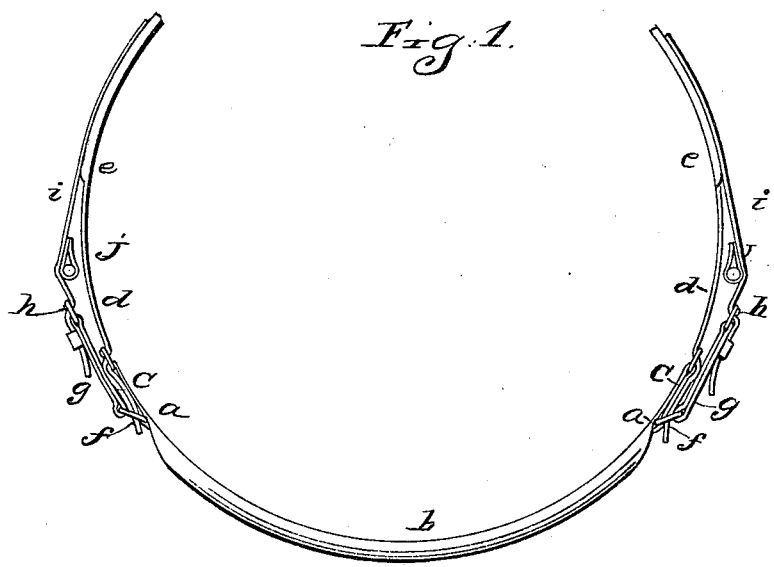
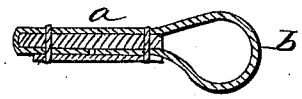
Witnesses:
Inventor

United States Patent Office.

S. G. CHEEVER, OF BOSTON, MASSACHUSETTS.

Letters Patent No. 91,087, dated June 8, 1869.

IMPROVEMENT IN HARNESS.

The Schedule referred to in these Letters Patent and making part of the same.

*To all whom it may concern:*

Be it known that I, S. G. CHEEVER, of Boston, in the county of Suffolk, and State of Massachusetts, have invented an Improvement in Harness; and I do hereby declare that the following, taken in connection with the drawings which accompany and form part of this specification, is a description of my invention sufficient to enable those skilled in the art to practise it.

This invention relates to an improvement in harness-girths, by which one girth is made to take the place of two now used, cheapening the harness, and simplifying it, and doing away entirely with the liability of pinching the skin of the horse, which constantly occurs when two girths are used, as in the common practice. Said two girths are, one for the harness-saddle, and one for the shafts, to keep them from lifting, and from swaying from side to side, the saddle-girth being drawn tightly against the skin of the horse, while the shaft-girth passes outside of the saddle-girth, under the horse. These two girths work and slip over each other, and frequently catch and pinch the skin of the animal between the edges of the girths, causing the horse to become restive and uneasy to an extent that often renders him unmanageable, and so occasions many accidents.

My improved girth is shown in edge view in

Figure 1, as attached to the ends of a saddle, and to the shaft-loops,

Figure 2 showing a cross-section of the girth.

The girth itself is denoted by $a$, and may be made quite simple and plain, or complex and ornamental, but, however made, should have, at its front edge, a roll, $b$, which may be stuffed with any soft material, said roll preventing any chafing or galling of the horse where the girth comes into contact with the rear of the fore legs or shoulders.

At the ends of the girth are two straps, $c$, provided with loops or buckles, into which are coupled the straps $d$, which are fixed to the saddle-ends $e$; and the ends of said straps may be passed through the loops $f$, which are secured to the outside of the girth, near its ends, and to which loops are attached straps $g$, terminated with buckles or loops $h$, which receive the straps which act to confine the shafts, said straps being either continuations of the straps, $i$, from the saddle, which hold the shaft-loops $j$, or separate straps, which may be wound around the shafts, and, if desired, passed through the shaft-loops in the winding.

It will now be seen that but one girth or belly-band is used under the horse, and that, by said girth, the saddle is confined as well as the shafts, and that the use of two separate girths under the horse is dispensed with, so that there are no rubbing and chafing of girths together, to their own detriment and wear, and that there can be no pinching of the skin of the horse.

It will also be seen that the saddle can be tightly girted, and the shafts loosely girted, by the arrangement shown, as well as by two separate entire girths.

I claim—

1. A girth made with the devices shown, or their equivalents, at each end of the girth, to receive the saddle and shaft-straps, substantially as and for the purpose described.

2. Also, a girth made as above claimed, and with the soft edge or roll, for the purpose set forth.

Witnesses:          S. G. CHEEVER.
   J. B. CROSBY,
   FRANCIS GOULD.